C. HUTCHINSON.
Nut-Locks.
No. 155,653. Patented Oct. 6, 1874.
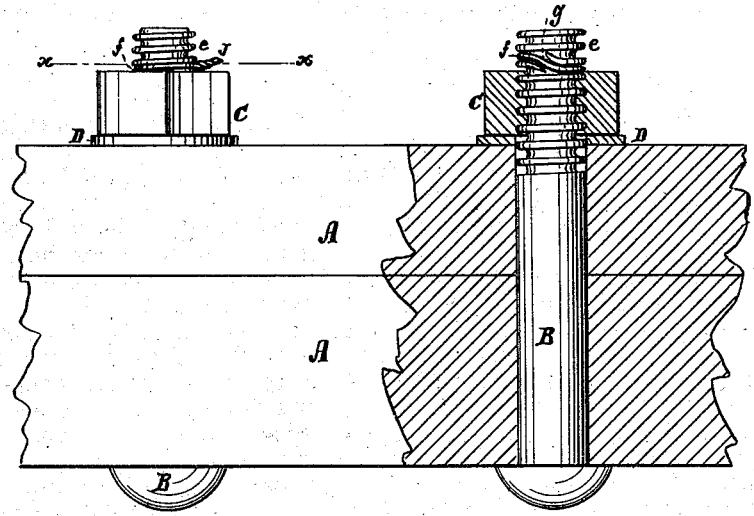
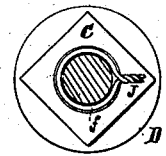
WITNESSES:
INVENTOR:
BY
ATTORNEYS.

UNITED STATES PATENT OFFICE.

CLARK HUTCHINSON, OF TONICA, ILLINOIS.

IMPROVEMENT IN NUT-LOCKS.

Specification forming part of Letters Patent No. 155,653, dated October 6, 1874; application filed July 25, 1874.

*To all whom it may concern:*

Be it known that I, CLARK HUTCHINSON, of Tonica, in the county of La Salle and State of Illinois, have invented a new and useful Improvement in Nut-Lock, of which the following is a specification:

This invention relates to a new and useful improvement in means for preventing the turning of nuts on screw-bolts; and it consists in cutting the screw-thread transversely and tying a wire around the bolt at that place, as hereinafter described.

In the accompanying drawing, Figure 1 represents a bolt with a nut locked according to my invention. Fig. 2 is a sectional view, showing the thread of the screw-bolt cut to allow of the passage of the stop-wire. Fig. 3 is a cross-section of Fig. 1, taken on the line $x\,x$.

Similar letters of reference indicate corresponding parts.

A A are two pieces of timber, through which the bolt passes. B is the bolt. C is the nut, which is turned down onto the intervening washer D. This washer is dispensed with when the bolt is used for fastening iron to iron, as in the case of fish-plates for rails of railroads, or where iron is fastened to wood. $e$ is the thread of the screw of the bolt. $f$ is the wire by which the nut is fastened or locked on the bolt. $g$ is a channel, which is cut through the thread by means of a cold-chisel made for the purpose, or by any suitable instrument. The ends of the thread thus severed are turned in opposite direction, so as to make the channel sufficiently broad to receive one or more convolutions of wire, substantially as seen in the drawing. The channel $g$ is made just outside of the nut after the nut has been turned "home," so that the stop-wire will pass between the side of the nut and the thread, as seen at $i$, Fig. 2. By this means the nut is securely locked or fastened on the bolt. The wire, after passing around the bolt through the channel $g$, has its ends twisted together, as seen at J. By means of the channel $g$, the wire is prevented from working upward, while it securely locks the nut.

This is a very effective and inexpensive nut-lock, and is especially valuable for fish-plate bolts, and for many other purposes connected with railroads.

Having thus described my invention, I claim as new and desire to secure by Letters Patent—

The process of locking screw-nuts by dividing the bolt-thread, bending the divided parts laterally, and applying a wire to pass between said parts and around the bolt, as shown and described.

CLARK HUTCHINSON.

Witnesses:
   S. W. BURGESS,
   HENRY GUNN.